United States Patent
Parmeter et al.

(10) Patent No.: US 9,976,602 B2
(45) Date of Patent: May 22, 2018

(54) TORQUE TRANSMITTING COUPLING FOR AN ELECTRICAL SUBMERSIBLE PUMP EQUIPMENT STRING

(71) Applicant: Summit ESP, LLC, Tulsa, OK (US)

(72) Inventors: Larry James Parmeter, Broken Arrow, OK (US); Jeffrey G. Frey, Broken Arrow, OK (US)

(73) Assignee: Summit ESP, LLC, Tulsa, OK (US)

( * ) Notice: Subject to any disclaimer, the term of this patent is extended or adjusted under 35 U.S.C. 154(b) by 0 days. days.

(21) Appl. No.: 15/051,179

(22) Filed: Feb. 23, 2016

(65) Prior Publication Data
US 2017/0241480 A1   Aug. 24, 2017

(51) Int. Cl.
| | | |
|---|---|---|
| *E21B 43/28* | (2006.01) | |
| *F04D 29/054* | (2006.01) | |
| *F16D 3/18* | (2006.01) | |
| *E21B 43/12* | (2006.01) | |

(52) U.S. Cl.
CPC ............ *F16D 3/185* (2013.01); *E21B 43/128* (2013.01); *F04D 29/054* (2013.01)

(58) Field of Classification Search
CPC ........................ E21B 4/04; E21B 43/28; F04D 29/044–29/0476; F04D 29/054; F16D 3/18; F16D 3/185; F16D 3/72; F16D 2001/103
USPC ................. 464/154, 157–159, 162, 169, 170
See application file for complete search history.

(56) References Cited

U.S. PATENT DOCUMENTS

| | | | | | |
|---|---|---|---|---|---|
| 3,261,182 | A | * | 7/1966 | Allen ...................... | F16D 3/185 464/154 |
| 3,279,216 | A | * | 10/1966 | Spaulding, Jr. ......... | F16D 3/185 464/154 |
| 3,613,395 | A | * | 10/1971 | Shigeura ................. | F16D 3/185 464/154 |

(Continued)

FOREIGN PATENT DOCUMENTS

| | | | | | |
|---|---|---|---|---|---|
| GB | 2264548 | A | * | 9/1993 | ............. F16D 3/185 |
| JP | 03129128 | A | * | 6/1991 | ............... F16D 3/18 |

OTHER PUBLICATIONS

Baker Hughes, "Baker Hughes Introduces ESP System for Deviated and Horizontal Wells," taken from http://www.bakerhughes.com/news-and-media/press-center/product-announcements/flexlift-curve-product-announcement-august-27-2014, Aug. 27, 2014, 1 page.

(Continued)

*Primary Examiner* — Josh Skroupa
(74) *Attorney, Agent, or Firm* — Frederic Dorwart, Lawyers PLLC; Penina Michlin Chiu

(57) ABSTRACT

A torque transmitting coupling for an electric submersible pump equipment string. A torque transmitting coupling system includes a first adapter including a first inner diameter mated to a first shaft rotatable about a first axis of rotation, and a first splined outer diameter mated to a splined coupling inner surface, a second adapter including a second inner diameter mated to a second shaft rotatable about a second axis of rotation, and a second splined outer diameter mated to the splined coupling inner surface, the first and second splined outer diameter at least partially spherical such that when the first axis of rotation moves with respect to the second axis of rotation, at least one of the splined outer diameters rock along the coupling inner surface.

24 Claims, 12 Drawing Sheets

(56) References Cited

U.S. PATENT DOCUMENTS

| | | | | |
|---|---|---|---|---|
| 4,018,062 | A * | 4/1977 | Bulliot | F16D 3/185 464/158 |
| 4,913,681 | A * | 4/1990 | Green | F16D 3/185 464/154 |
| 5,224,898 | A * | 7/1993 | Johnson | E21B 17/07 175/321 |
| 5,911,630 | A * | 6/1999 | Shigeura | F16D 3/848 277/403 |
| 6,283,869 | B1 * | 9/2001 | Spensberger | F16D 3/185 464/153 |
| 6,780,037 | B1 * | 8/2004 | Parmeter | H01R 13/523 439/191 |
| 7,611,338 | B2 * | 11/2009 | Swatek | F04D 13/10 310/59 |
| 7,810,586 | B2 * | 10/2010 | Cousins | E21B 17/046 175/101 |
| 2014/0370995 | A1 * | 12/2014 | Collins | E21B 17/02 464/138 |
| 2015/0130185 | A1 | 5/2015 | Knapp | |
| 2015/0240879 | A1 * | 8/2015 | Takagi | F16D 3/185 464/154 |

OTHER PUBLICATIONS

Baker Hughes, "CENesis Curve Tight-Radius System," taken from http://www.bakerhughes.com/products-and-services/production/artificial-lift/production-solution/cenesis-curce-tight-radius-system, Date Unknown, 1 page.

Baker Hughes, "CENesis Curve Tight-Radius System," taken from http://www.bakerhughes.com/news-and-media/resources/brochures/cenesis-curve-tight-radius-system-ov, Date Unknown, 1 page.

Baker Hughes, "CENesis Curve Tight-Radius System," Product Brochure taken from http://assets.cmp.bh.mxmcloud.com/system/ae/4cd220bdc311e48ee01b62a36f9842/41319-CENesis-Curve_OverviewFINAL0215.pdf, Feb. 26, 2015, 2 pages.

* cited by examiner

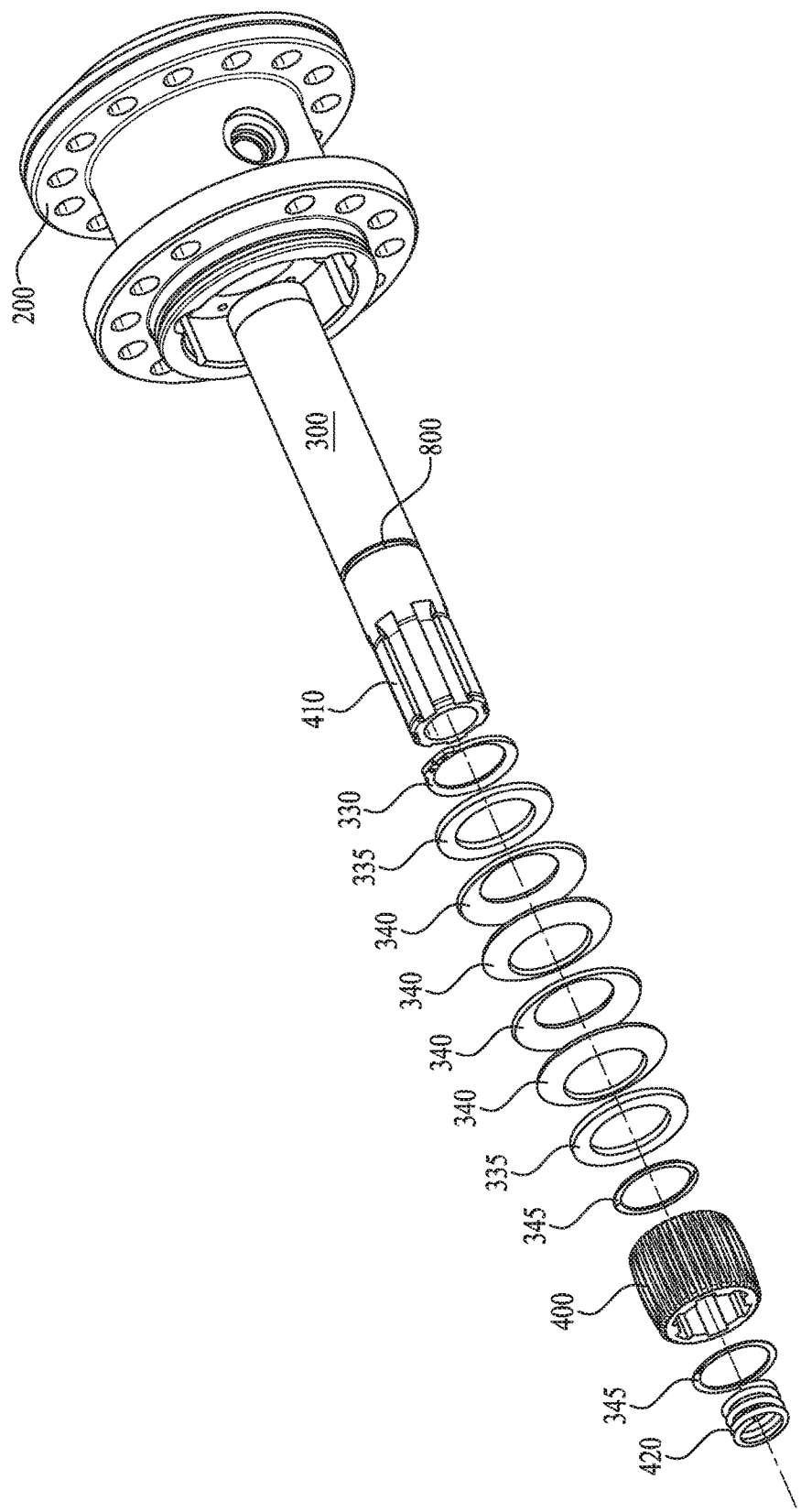

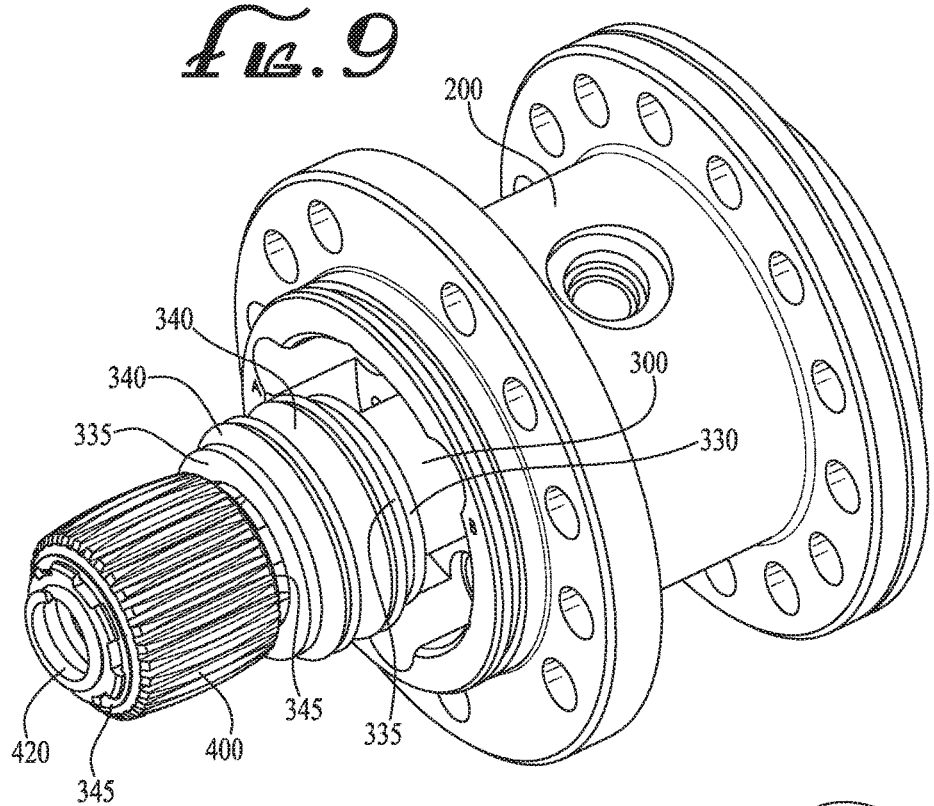
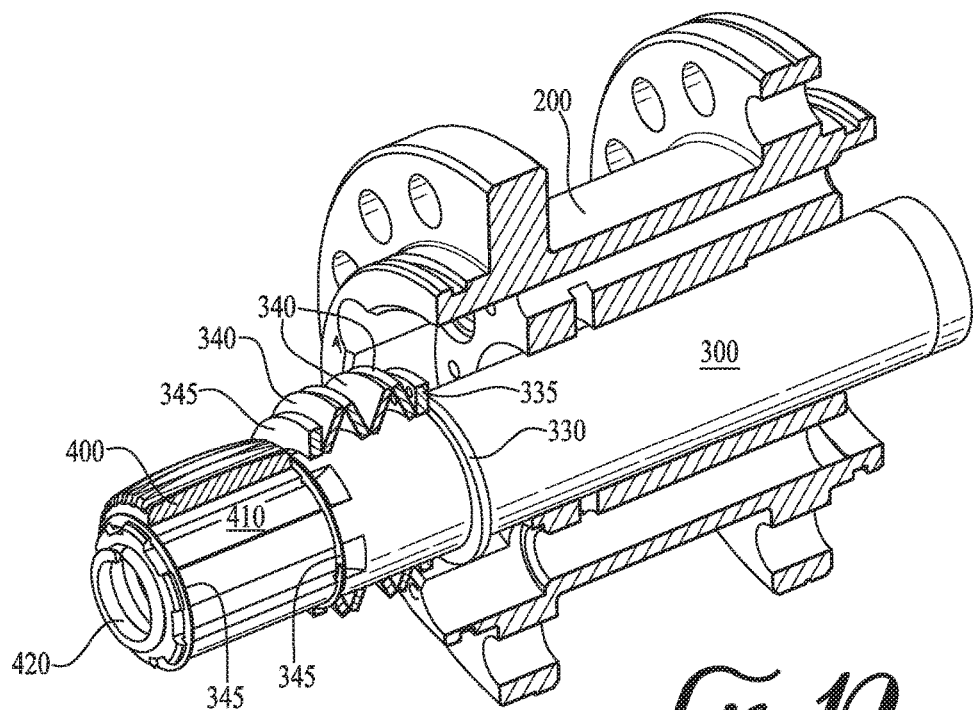

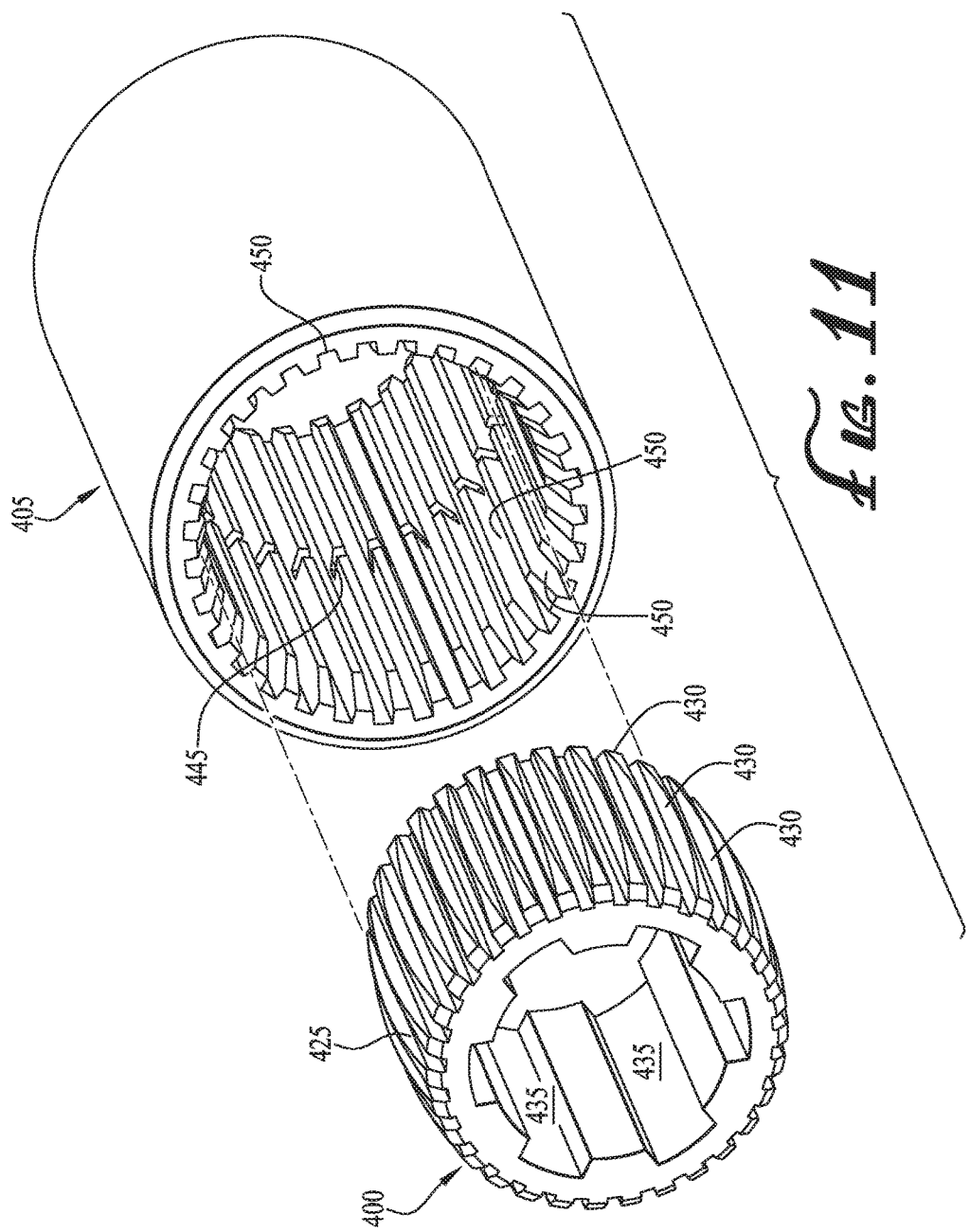

TORQUE TRANSMITTING COUPLING FOR AN ELECTRICAL SUBMERSIBLE PUMP EQUIPMENT STRING

BACKGROUND OF THE INVENTION

1. Field of the Invention

Embodiments of the invention described herein pertain to the field of electric submersible pump (ESP) assemblies. More particularly, but not by way of limitation, one or more embodiments of the invention enable a torque transmitting coupling for an ESP equipment string.

2. Description of the Related Art

Electric submersible pumps (ESP) have been in use for nearly a century and over that time period little has changed mechanically from the historical design. Most improvements have been in the nature of better wire insulation, lubrication and bearing materials. Historical design, however, does not support the modern trend toward directional drilling, which causes bends in downhole wells. In directional drilling, the drill bit may be realigned from a traditional vertical direction to a horizontal direction to reach larger pockets of oil or other desirable resources. In doing so the bit travels in an arc with a fairly small radius. To reach resources in a horizontal direction the arc (degree of bend) of the hole will have to be large enough to allow the ESP equipment to pass through without any yielding of flanges, bolts, shaft couplings or housings. However, in some cases the exact depth and true distance to the bend required is unknown in advance. Unexpectedly, the ESP equipment may be required to bend more than the maximum safe bend of 10 degrees/100 feet, such as 25°/100 feet. A bend greater than 10°/100 feet can lead to permanent damage to the shaft couplings that transmit torque from each piece of equipment to the string, such as between two tandem motors, between the motor and seal section, between the seal section and gas separator and/or between the seal section and pump.

Another obstacle that occurs between two such shafts coupled together is a condition called "torque lock". When two motors are coupled together in tandem, the upper (or downstream) motor may experience greater thermal expansion than the bottom (or upstream) motor at the coupling interface. The top shaft will expand up to ⅜ inch downwards. Since the coupling is transmitting torque between the shafts, the upper shaft must be allowed to move freely inside the coupling. If the torque is sufficient enough it will resist shaft movement and overload the lower motor's thrust bearing located just below the coupling. This will cause a complete failure of the entire ESP string. Torque lock is exacerbated if the equipment is in a bend, as would be the case if the motors were located in the arc transition inside the well bore.

As is apparent from the above, currently available shaft couplings are not engineered to support modern wells that contain bends or handle torque. Therefore, there is a need for a torque transmitting coupling for ESP equipment strings, to increase the bend tolerance of ESP assemblies beyond ten degrees per one-hundred feet and to better resist torque lock.

BRIEF SUMMARY OF THE INVENTION

One or more embodiments of the invention enable a torque transmitting coupling for an electric submersible pump (ESP) equipment string.

An illustrative embodiment of an electric submersible pump (ESP) shaft coupling includes a first adapter including a first tubular inner diameter mateable to a first ESP shaft, and a first spherical outer diameter, a second adapter including a second tubular inner diameter mateable to a second ESP shaft, and a second spherical outer diameter, the first spherical outer diameter and the second spherical outer diameter rockably mated to a common coupling. In some embodiments, the ESP shaft coupling further includes a concave housing around the common coupling. In certain embodiments, the ESP shaft coupling includes an ESP motor head secured to a first side of the concave housing, and an ESP motor base secured to a second side of the concave housing. In certain embodiments, the ESP shaft coupling includes a series of conical spring washers around each of the first and second ESP shafts. In some embodiments, the first spherical outer diameter and the second spherical outer diameter are circumferentially mated to the common coupling by spline.

An illustrative embodiment of a torque transmitting coupling system includes a first adapter including a first inner diameter mated to a first shaft rotatable about a first axis of rotation, and a first splined outer diameter mated to a splined coupling inner surface, a second adapter including a second inner diameter mated to a second shaft rotatable about a second axis of rotation, and a second splined outer diameter mated to the splined coupling inner surface, the first and second splined outer diameter at least partially spherical such that when the first axis of rotation moves with respect to the second axis of rotation, at least one of the splined outer diameters rock along the coupling inner surface. In some embodiments, the torque transmitting coupling system further includes a plate separating the first and second adapters, the plate seated in a groove in the splined coupling inner surface. In certain embodiments, the torque transmitting coupling system further includes a first spring between the plate and the first shaft and a second spring between the plate and the second shaft. In some embodiments, the splined coupling transmits a torque from the first rotatable shaft to the second rotatable shaft. In certain embodiments, the torque transmitting coupling system further includes a series of conical spring washers around one of the first shaft, the second shaft, or a combination thereof. In some embodiments, the torque transmitting coupling system includes a pair of thrust washers sandwiching the series of conical spring washers. In certain embodiments, the first rotatable shaft and the second rotatable shaft are electric submersible pump equipment string shafts. In some embodiments, the first inner diameter is mated to the first shaft by spline, and the second inner diameter is mated to the second shaft by spline.

An illustrative embodiment electric submersible pump (ESP) equipment string includes a first electric submersible motor comprising a first motor shaft, a second electric submersible motor in tandem with the first electric submersible motor, the second electric submersible motor including a second motor shaft, the first motor shaft mated to a first inner diameter of a first adapter, the second motor shaft mated to a second inner diameter of a second adapter, the first motor shaft coupled to the second motor shaft by a tubular shaft coupling, the tubular shaft coupling including a splined inner diameter mated to a first splined outer diameter of the first adapter, and a second splined outer diameter of the second adapter, the first and second splined outer diameters curved to form a runner surface on each of the first and second adapters, the runner surfaces rockable axially along the splined inner diameter. In some embodiments, the ESP equipment string further includes a spring member around each of the first and second motor shafts between a retaining ring and the tubular shaft coupling. In certain embodiments, the spring member is a plurality of conical spring washers. In certain embodiments, the ESP equipment string further includes a thrust washer between the retaining ring and the plurality conical spring washers. In some embodiments, the runner surfaces rock when the first motor shaft moves out of axial alignment with the second motor shaft. In certain embodiments, a torque is transmitted from the second motor shaft to the first motor shaft.

An illustrative embodiment of an electric submersible pump (ESP) assembly includes a first end of a first shaft facing a second end of a second shaft, a splined coupling extending around the first end and the second end, an adapter around each of the first end and the second end, each adapter between the splined coupling and one of the shaft ends, wherein each adapter includes a torque transmitting member around an inner diameter mated with at least one of the shaft ends, a set of splines around an outer diameter mated with the splined coupling, and the outer diameter of the adapter tapered in an axial direction. In some embodiments, the first shaft is a motor shaft and the second shaft is a seal shaft. In certain embodiments, the first shaft is a seal shaft and the second shaft is one of a gas separator shaft, a pump shaft or an intake shaft. In some embodiments, both sides of the adapter outer diameter are symmetrically tapered from center. In certain embodiments, the taper is spherical. In some embodiments, the ESP assembly further includes a plate extending centrally inside the coupling between the first end and the second end, the plate seated in a groove extending around an inner diameter of the coupling. In some embodiments, the ESP assembly includes a set of conical spring washers in series around one of the first shaft, the second shaft, or a combination thereof. In certain embodiments, the set of conical spring washers are around one of the first shaft or the second shaft and between a motor base and the coupling. In some embodiments, the ESP assembly includes a concave housing around the splined coupling. In certain embodiments, the torque transmitting member is one of splines, a key joint or a pin joint.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of illustrative embodiments of the invention will be more apparent from the following more particular description thereof, presented in conjunction with the following drawings wherein:

FIG. 8 is an expanded perspective view of exemplary components of a shaft adapter system of an illustrative embodiment.

FIG. 9 is a perspective view of a shaft adapter system of an illustrative embodiment.

FIG. 11 is a perspective view of an adapter and coupling of illustrative embodiments.

FIG. 16 is a cross sectional view of a pair of adapters mated to a coupling of an illustrative embodiment in a bent position.

Figure 1:
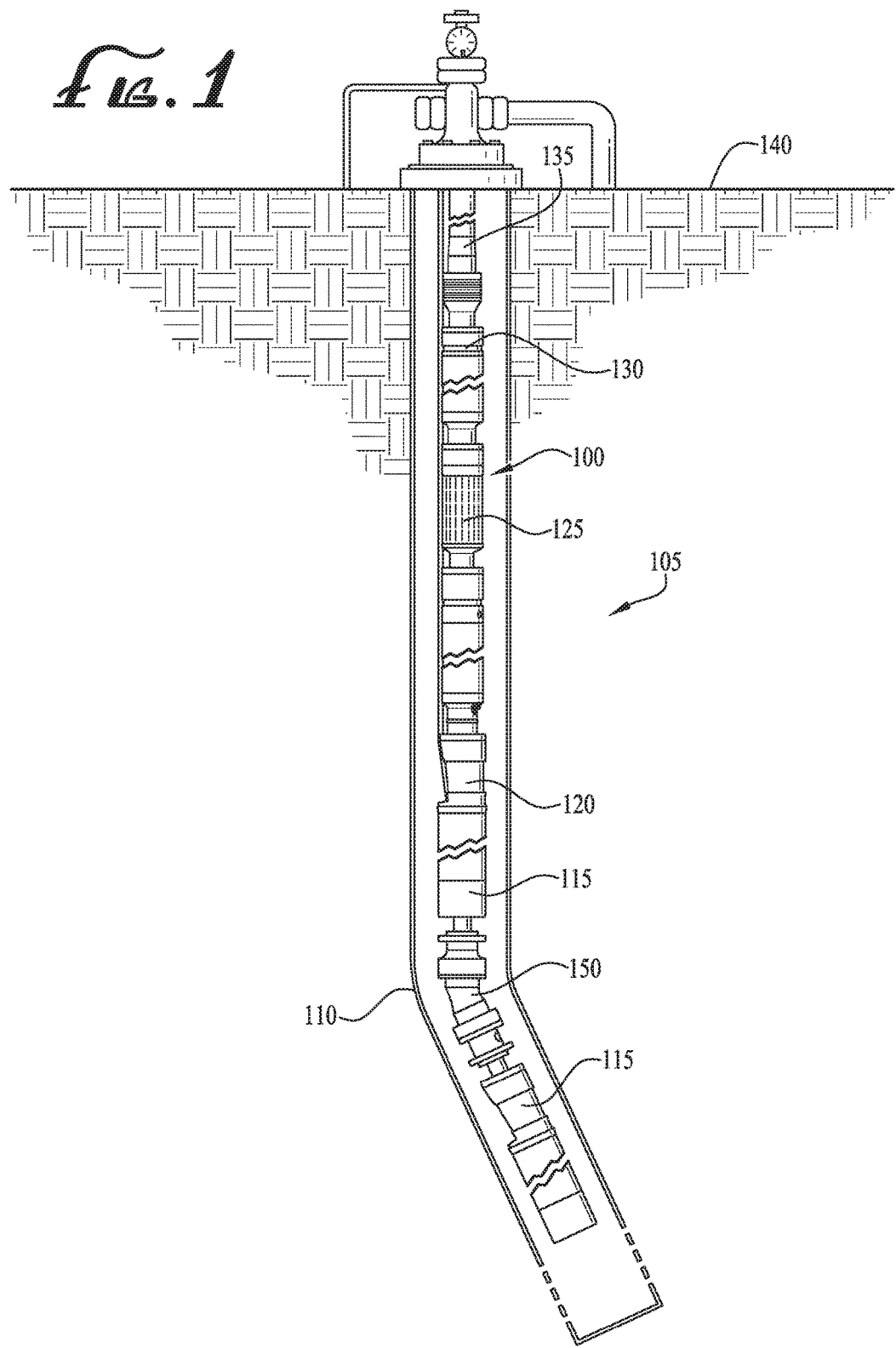
FIG. 1 is a perspective view of an electric submersible pump (ESP) equipment string of an illustrative embodiment downhole in a bent well.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives to such embodiments that fall within the scope of the present invention as defined by the appended claims.

DETAILED DESCRIPTION

A torque transmitting coupling for an electric submersible pump (ESP) equipment string will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a spline includes one or more splines.

This specification makes use of a cylindrical coordinate system, where the origin is at the center of the ESP equipment string shaft, and the length of the shaft corresponds to the longitudinal axis. As used in this specification and the appended claims, "axial" or "axially" refers to the direction along or substantially parallel to the longitudinal axis, and/or axis of rotation, of the ESP equipment string shaft. A radial surface is substantially perpendicular to the axial direction.

As used in this specification and the appended claims, "coupled" refers to either a direct connection or an indirect connection (e.g., at least one intervening connection)

between one or more objects or components. The phrase "directly attached" means a direct connection between objects or components.

As used herein, the term "outer" or "outward" means the radial direction away from the center of a shaft and/or the aperture of a component through which the shaft would run. In the art, "outer diameter" (OD) and "outer circumference" are sometimes used equivalently. As used herein, the outer diameter is used to describe what might otherwise be called the outer circumference of an component such as an adapter. Furthermore, "outer diameter" is also sometimes used to refer more liberally to the outer surface of a component.

As used herein, the term "inner' or "inward" means the radial direction towards the center of a shaft and/or the aperture of a component through which the shaft would run. In the art, "inner diameter" (ID) and "inner circumference" are sometimes used equivalently. As used herein, the inner diameter is used to describe what might otherwise be called the inner circumference of a component, such as a coupling or adapter.

As used in this specification and the appended claims, the term "spherical" refers to portions curved in the nature of a sphere, but "spherical" is not limited to complete spheres unless the context clearly so dictates.

Illustrative embodiments provide a self-aligning torque transmitting coupling for use in electric submersible pump equipment strings. The coupling system of illustrative embodiments may transmit torque between shafts through bends as tight as twenty-five degrees over one-hundred feet, which may increase the bend tolerance of conventional ESP assemblies by up to one-hundred-fifty percent (from 10°/100 feet to 25°/100 feet). The flexible coupling system of illustrative embodiments may further be compressible to combat torque lock.

For ease of description and so as not to obscure the invention, illustrative embodiments are described in terms of a downhole pumping embodiment, such as an oil, water and/or gas lift scenario making use of an electric submersible pump assembly, but nothing herein is intended to limit the invention to that embodiment. Illustrative embodiments provide a flexible coupling for any system that transmits torque between rotatable shafts, through a bend of up to twenty-five degrees per one hundred feet. Without limiting the foregoing and so as not to obscure the invention, illustrative embodiments are primarily described in terms of a coupling between tandem ESP motors, but the invention is not so limited. Illustrative embodiments may be equally applicable to couplings between a motor and a seal section, a seal section and a gas separator, a seal section and a pump or any other adjacent rotatable shafts that may be required to operate in a bend or pass through a bend, and/or any adjacent shafts that may experience differing rates of thermal expansion.

Illustrative embodiments may provide a self-aligning coupling between two tandem rotating shafts. The adjacent ends of each shaft may be splined and mated to a tubular inner diameter of an adapter, one adapter mated to each shaft. Each adapter may be further splined on an outer diameter and mated to a splined inner diameter of a common coupling, the common coupling extending tubularly around both adapters. The outer diameter of each adapter may have a spherical-like curvature in an axial direction, such that when the adapters and coupling are mated, the outer surface of the adapter forms a runner that is rockable in an axial direction along the splined inner diameter of the tubular coupling. The splines may allow torque to be transmitted from the one shaft to the other through the common coupling. If one shaft moves out of axial alignment with respect to the adjacent shaft, the adapters may rock in response to the misalignment without becoming unmated from the coupling. This self-aligning feature may reduce damage to the equipment string that might otherwise occur due to operation within or passing through a curve. A spring element such as a series of conical spring washers may be included on each shaft. The spring elements may provide compressibility to accommodate thermal expansion of the shafts, even if the rate of thermal expansion differs between tandem shafts.

FIG. 1 illustrates an exemplary ESP assembly (ESP equipment string) downhole in a well with a bend of twenty-five degrees per one-hundred feet. As shown in FIG. 1, ESP assembly 100 has been deployed in downhole well 105, which well 105 contains bend 110. Well 105 may include a bend from vertical towards a horizontal orientation due to subsurface features, composition, location of deposits, and other factors well known in the art. The currently available couplings commonly used in ESP applications typically tolerate a bend of no more than 10°/100 feet, greatly limiting their ability to be used in curved wells. As shown, ESP assembly 100 includes two tandem motors 115 connected by flexible joint 150. In FIG. 1, ESP motors 115 are operating at or near bend 110, causing the shafts of the two motors 115 to be out of axial alignment with one another. Each motor 115 may be an electric submersible motor between about five and forty feet in length, and may be a two-pole, three-phase squirrel cage induction motor. Bend 110 may be up to and including twenty five degrees per one-hundred feet. Motor protector (seal section) 120 may protect motor 115 from the ingress of well fluid, provide separation between well fluid and motor oil, and may provide pressure equalization. Intake 125 may serve as the intake for well fluid into the pump. ESP pump 130 may be a multi-stage centrifugal pump that lifts well fluid to surface 140 of well 105 or to a collection location through production tubing 135. ESP motor(s) 115, motor protector 120, intake 125 and ESP pump 130 all may include shafts extending longitudinally through them. ESP motor(s) 115 rotate the motor shafts, which in turn rotate the shafts of motor protector 120, intake 125 and ESP pump 130, which are all connected together such as by spline or key. In gassy wells, a charge pump may also be included in the equipment string as a lower tandem pump and/or a gas separator may be included in place of intake 125 or in conjunction with intake 125.

Figure 2:
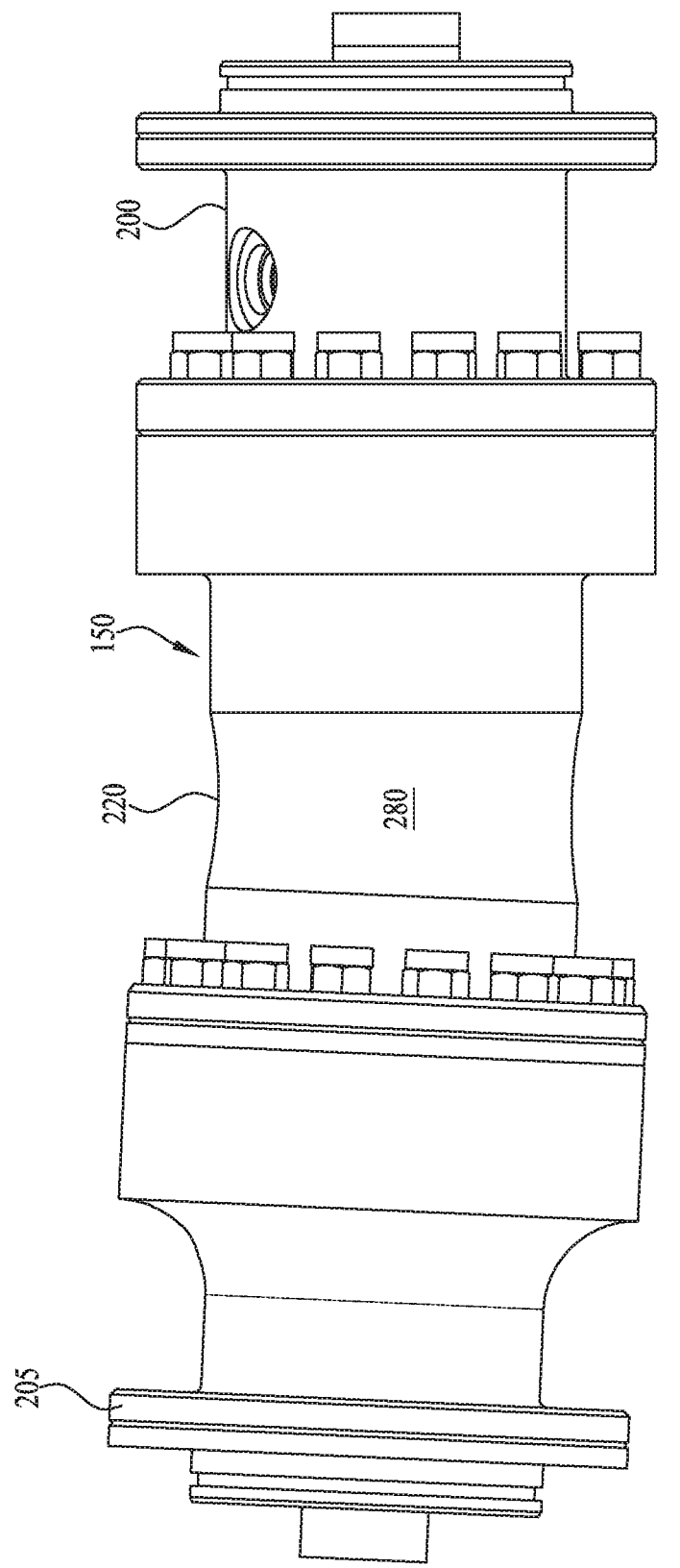
FIG. 2 is an elevation view of a flexible joint of an illustrative embodiment.

FIG. 2 illustrates a flexible joint of an illustrative embodiment. Flexible joint 150 may connect one motor 115 to another tandem motor 115, may connect motor 115 to motor protector 120, may connect motor protector to intake 125, may connect intake 125 to pump 130, may connect pump 130 to a tandem pump or may serve as connection between any two components of an equipment string that each include rotatable shafts and require torque to be transmitted between those shafts. In the example shown in FIG. 2, flexible joint 150 connects motor base 200 of downstream motor 115 to motor head 205 of upstream motor 115. Flexible joint 150 may include housing 280 made of a material similar to motor base 200 or motor head 205, such as carbon steel or a corrosion resistant alloy such as 316 stainless steel. As illustrated, flexible joint 150 may be concave in shape, such that its diameter is smallest at joint center 220, and the diameter may increase symmetrically away from joint center 220. The concave geometry may lower the rigidity of flexible joint 150 at joint center 220, which may increase flexibility of joint 150. Motor head 205, motor base 200 and flexible joint 150 may be connected by screws 415 (shown in FIG. 5) bolts, and/or clamps.

Figure 3:
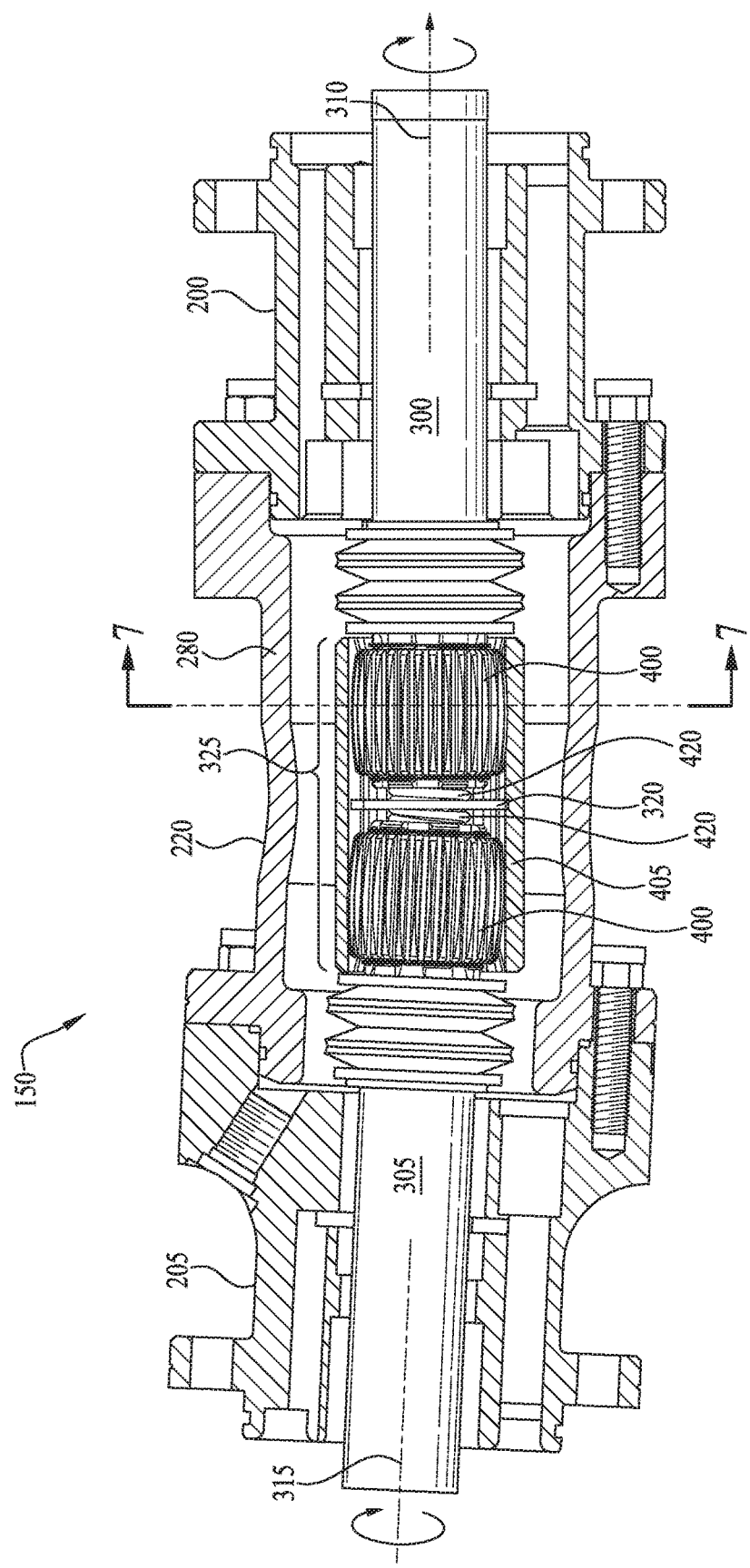
FIG. 3 is a partial cross sectional view across line 3-3 of FIG. 7 of a shaft coupling system of an illustrative embodiment.

FIG. 3 illustrates a cross sectional view of an exemplary flexible joint with a shaft coupling system of an illustrative embodiment. As shown in FIG. 3, flexible joint 150 connects downstream shaft 300 and upstream shaft 305, which are each rotatable shafts that may extend respectively through motor base 200 and motor head 205, or any other adjacent equipment string components as described herein. Downstream shaft 300 may rotate about first axis of rotation 310 and upstream shaft may rotate about second axis of rotation 315. In FIG. 3, first axis of rotation 310 and second axis of rotation 315 are shown in alignment. In the example of FIG. 3, upstream shaft 305 and downstream shaft 300 are shafts of motors 115, but the invention is not so limited. Upstream shaft 305 and/or downstream shaft 300 may belong to a motor protector, intake, gas separator, charge pump or centrifugal pump. Upstream shaft 305 and downstream shaft 300 extend towards each other and may be separated by central plate 320 such that the adjacent ends of shafts 300, 305 do not touch each other. Compression springs 420 may be secured onto and/or placed between each end of shafts 300, 305 on the one hand and central plate 320 on the other hand, which may serve to center shafts 300, 305 inside coupling 405, absorb shock during placement of shafts 300, 305 and/or to allow for thermal expansion of the shafts 300, 305.

In rotating systems such as ESP pump equipment strings, it may be desirable to transmit torque between adjacent shafts. For example, if a two-hundred horse power motor is needed, two one-hundred horsepower motors may be employed in series in the equipment string, with the torque from the first motor 115 passing to the second tandem motor 115 to provide cumulative horsepower. This horsepower may be transmitted up the equipment string all the way to pump 130. FIG. 3 illustrates an exemplary torque transmitting coupling system. Torque transmitting coupling system 325 may include one or more adapters 400 and a coupling 405. In FIG. 3, two adapters 400 are shown, one around each shaft 300, 305.

Figure 4:
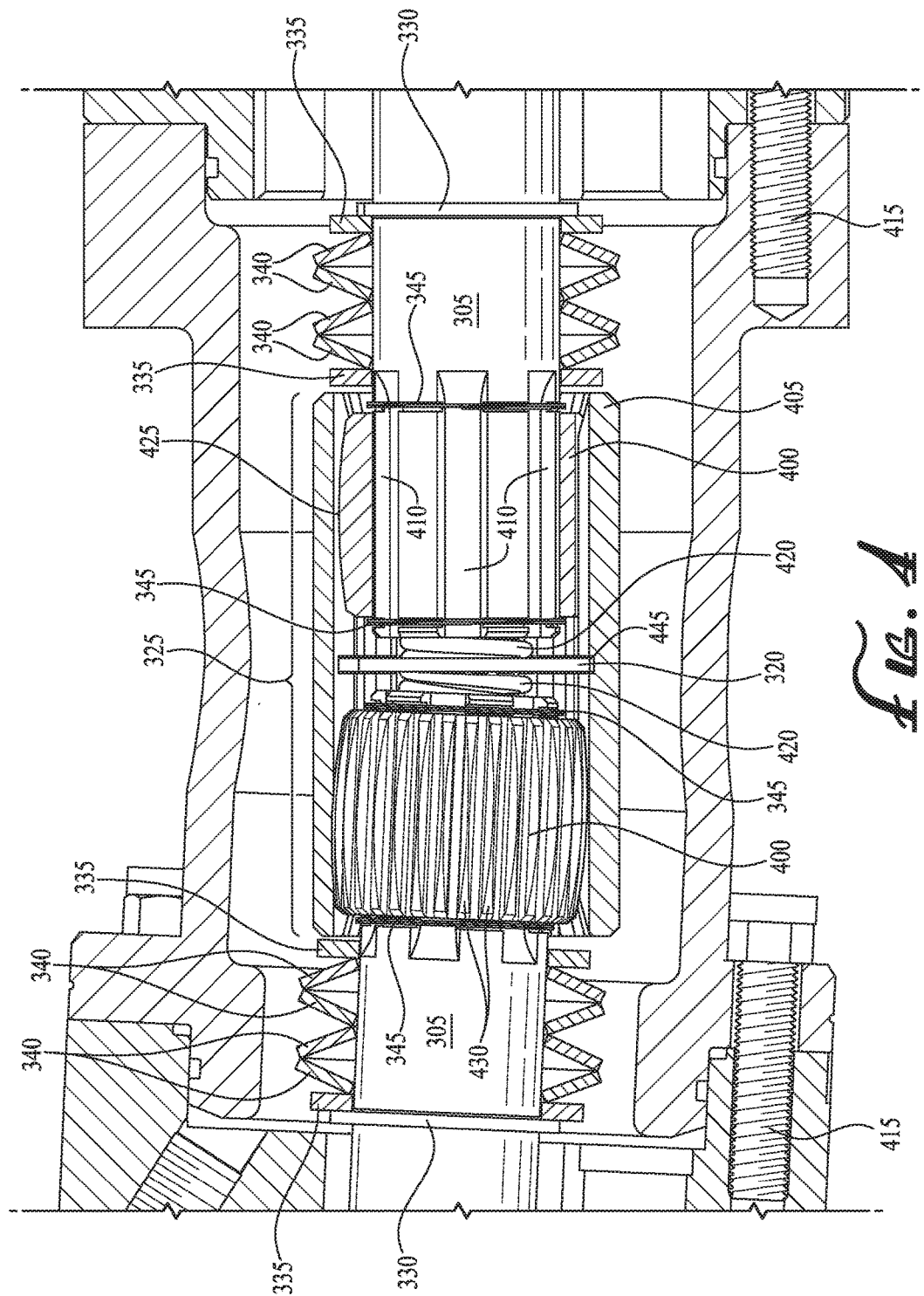
FIG. 4 is a partial cross sectional view of a shaft coupling system of an illustrative embodiment.

FIG. 4 illustrates an enlarged view of torque transmitting coupling system 325. For ease of illustration, in FIG. 4, two adapters 400 are shown with one adapter 400 in cross section and one adapter 400 in perspective. Downstream shaft 300 and upstream shaft 305 may each include shaft torque-transfer member 410, which may be splines, a keyed joint, a pinned joint or another torque-transfer mechanism known in the art. In the example shown in FIG. 4, torque transfer member 410 is a series of splines that extend axially along the ends of shafts 300, 305 and are dispersed circumferentially around shafts 300, 305. Adapter 400 may be generally shaped like a hollow cylinder and include inner mating members 435 (shown in FIG. 7) that may be dispersed around its inner diameter. Inner mating member 435 may mate to torque transfer member 410. In one example, if torque transfer member 410 are male splines, then inner mating member 435 may be female splines. In another example, if torque transfer member 410 is a key, then inner mating member 435 may be a keyway. As upstream shaft 305 or downstream shaft 300 rotates about its central axis 310, 315, its respectively mated adapter 400 may also rotate.

In a departure from a true hollow-cylinder shape, adapter outer diameter 425 may instead be curved, tapered, rounded and/or spherical, for example as shown in FIG. 4. In one example adapter outer diameter 425 may be curved like a spherical segment with two sides of the sphere cut off by parallel planes. In another example, adapter outer diameter 425 may be tapered, with the outer diameter decreasing from center, symmetrically towards upstream and downstream sides of adapter 400. Adapter retaining rings 345 may be placed on the upstream and downstream sides of adapter 400, around shafts 305 and/or 300, to secure adapter in place axially, retain axial load and/or prevent sliding. Adapter retaining rings 345 may be spiral retaining rings, low profile spiral type retaining rings and/or circular wire clips and may be carbon steel or 316 stainless steel, for example. In some embodiments, adapter retaining rings 345 may be about 0.046 inches thick and capable of holding 6,000 pounds.

Figure 7:
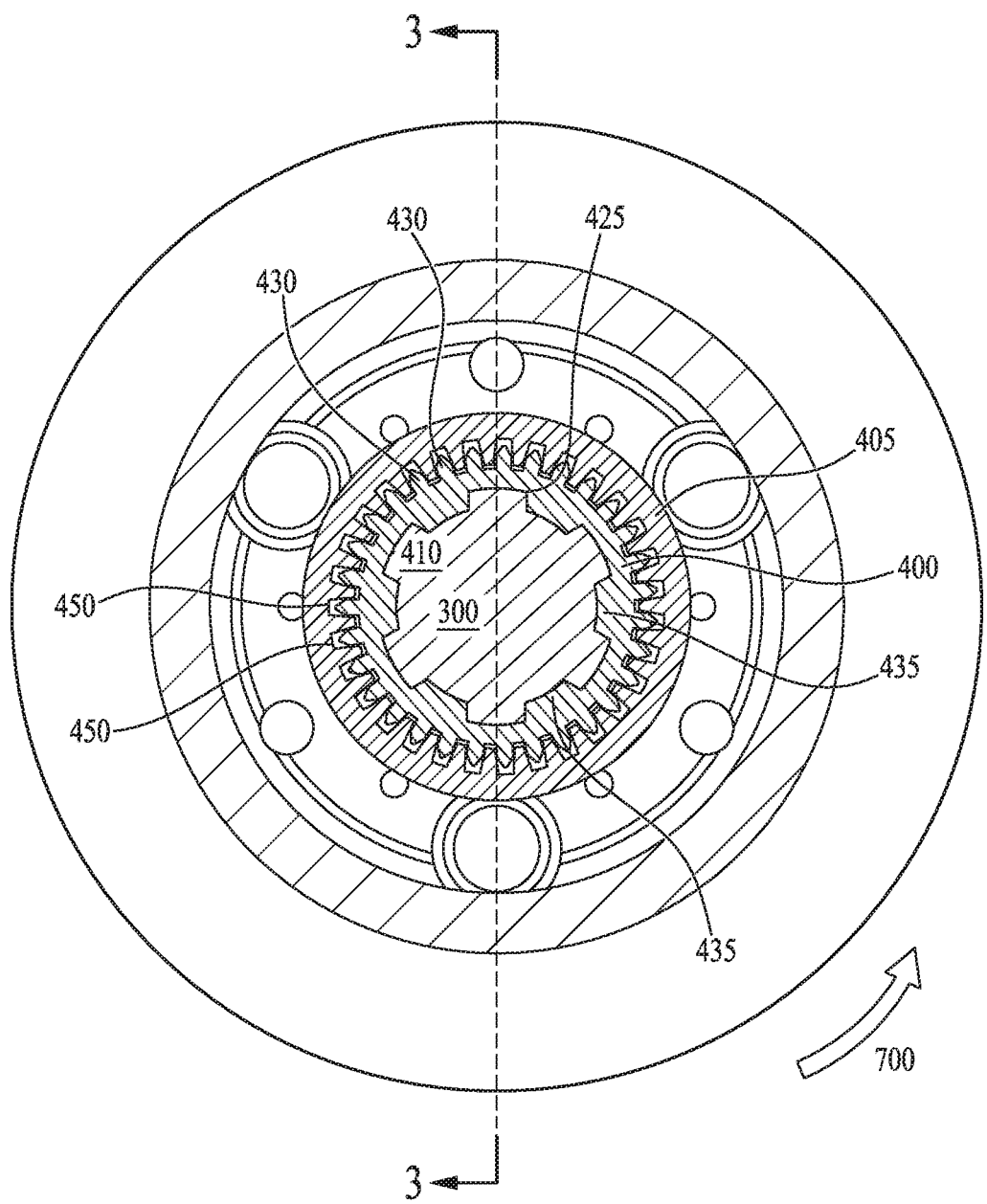
FIG. 7 is a cross sectional view across line 7-7 of FIG. 3 of a shaft coupling system of an illustrative embodiment.

Adapter outer diameter 425 may include outer splines 430 extending axially across adapters 400, which outer splines 430 may be dispersed circumferentially around adapter outer diameter 425. Turning to FIG. 7, outer splines 430 of adapter 400 may mate to coupling splines 450 of coupling 405. Coupling splines 450 may extend axially around the inner diameter of coupling 405. Coupling splines 450 may extend axially across substantially the entire length of coupling 405 and cover the inner surface of coupling 405. When mated, outer splines 430 and coupling splines 450 may be engaged around substantially the entire outer diameter 425 of adapter 400, save where contact is lost due to the curvature and/or rocking of adapter outer diameter 425 as described herein. Coupling 405 may rotate with adapters 400, which in turn rotate with shafts 300, 305 around axes of rotation 310, 315. The material selected for adapter 400 and/or coupling 405 may depend upon the type of working fluid, but some exemplary materials are heat treated 4140 carbon steel or 316 stainless steel. Adapter 400 and/or coupling 405 may be machined or otherwise shaped with the strength to transmit torque as known to those of skill in the art.

Figure 12:
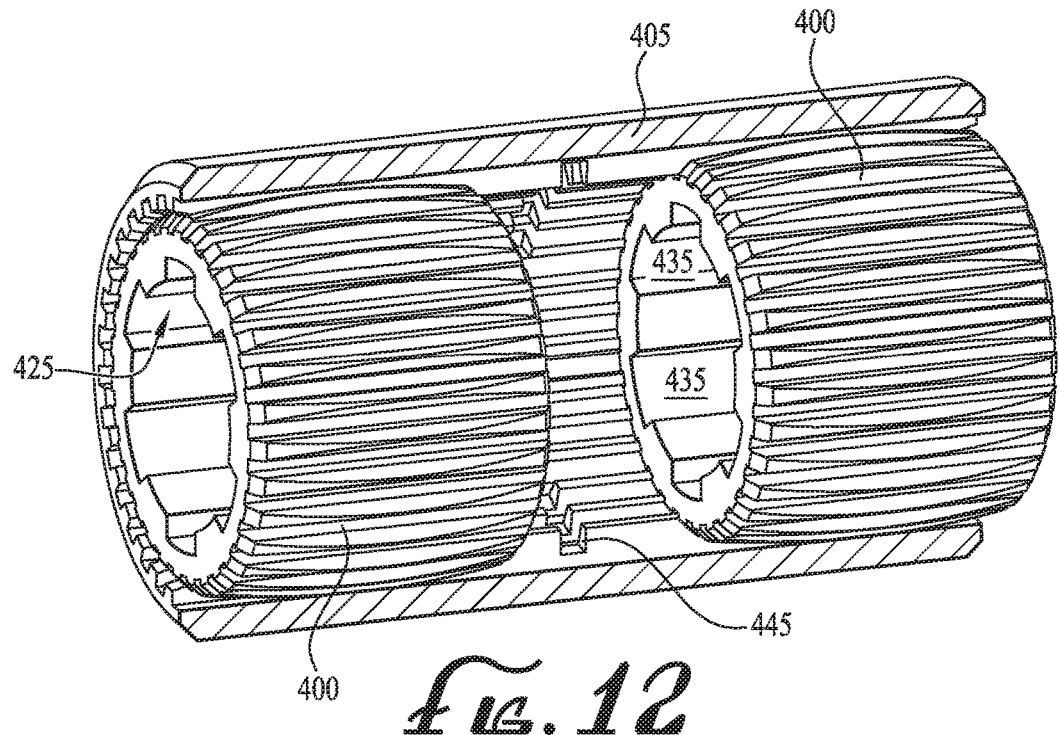
FIG. 12 is a perspective view of a pair of adapters mated to a coupling of an illustrative embodiment.
Figure 13:
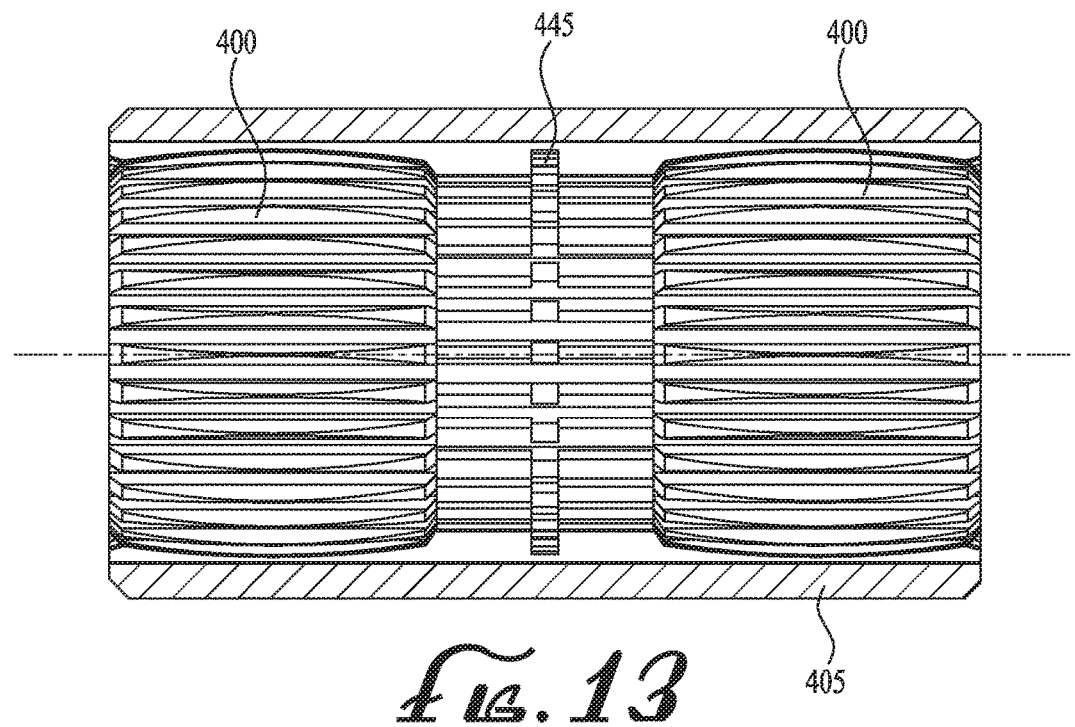
FIG. 13 is a perspective view of a pair of adapters mated to a coupling of an illustrative embodiment in a straight position.

Returning to FIG. 4, coupling 405 may be tubular, annular and/or cylindrical in shape and extend around (outwards of) adapters 400 on both shafts 300, 305 and/or the shafts between which torque is to be transmitted. In the example shown in FIG. 4, coupling 405 extends around two adapters 400, one adapter 400 on each shaft 300, 305. FIG. 11 illustrates an example of an adapter 400 mateable to coupling 405. Outer diameter 425 of adapter 400 may be smaller than the inner diameter of coupling 405 such that adapter 400 slides into and fits inward of coupling 405. FIGS. 12-13 illustrate an example of two adapters 400 mated to coupling 405 in the absence of a bend. When shafts 300, 305 are mated to the adapters 400, torque from upstream shaft 300 may be transmitted to downstream shaft 300 through common coupling 405. Coupling 405 may include a central groove 445 around its inner diameter, which groove 445 may be circular and seat central plate 320. In some embodiments, central plate 320 may be conical in shape.

Figure 10:
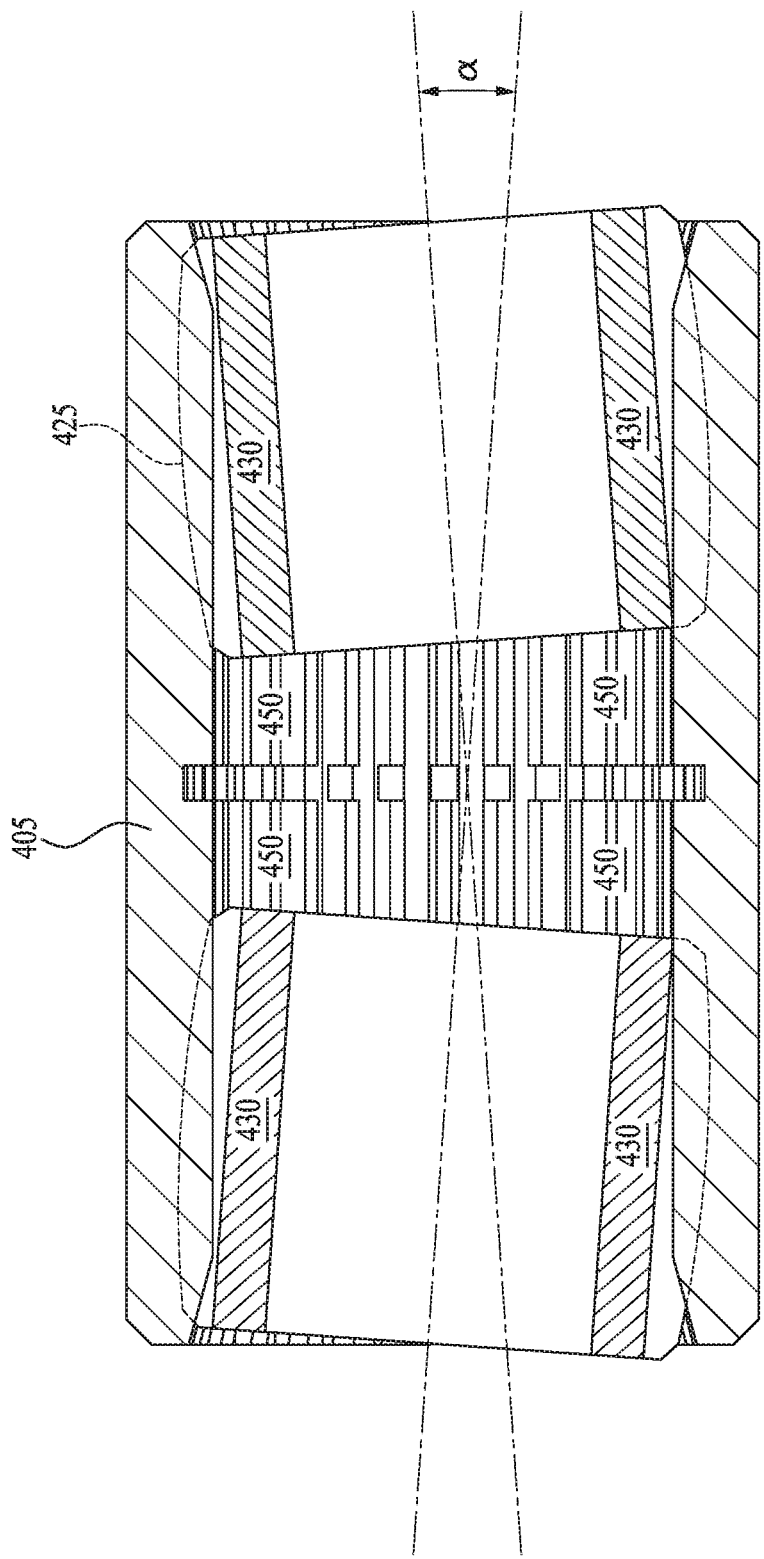
FIG. 10 is a partial cross sectional view of a shaft adapter system of an illustrative embodiment.

A set and/or series of conical spring washers 340 may be placed around shafts 300, 305 between adapters 400 and base 200 and/or head 205. For example, a plurality of conical spring washers 340 may be between thrust washers 335, which thrust washers 335 sit between adapter 400 and snap ring 330, as shown in FIG. 8. FIG. 8 is an exploded view of an exemplary shaft adapter system implemented on downstream shaft 300, whilst FIG. 9 and FIG. 10 show an example of these elements assembled on shaft 300. A mirror image arrangement may similarly be placed on upstream shaft 305, with coupling 405 extending between them and central plate 320 separating them. Conical spring washers 340 may be placed in series (with curvature in alternating direction) to allow for a spring rate with a longer stroke and may allow shafts 300, 305 to move freely within coupling 405. Conical spring washers 340 may prevent or reduce torque lock in instances where downstream shaft 300 expands thermally at a greater rate than upstream shaft 305 or vice versa. In FIG. 4, four conical spring washers 340 are located on each side of coupling 405 and/or on each shaft 300, 305. Conical spring washers 340 may be sandwiched by thrust washers 335, which may be placed in grooves on shafts 300, 305. Snap ring 330 may transfer load from thrust washers 335 to shaft 300, 305 and be seated and/or locked in retaining ring groove 800 on shaft 300, 305. Snap ring 330 may retain axial load and/or prevent shaft adapter system from sliding down shafts 300, 305. Snap ring 330 may be a retaining ring or heavy retaining ring. In some embodiments, snap ring 330 may be about 0.080 inches thick and capable of holding about 20,000 pounds.

FIG. 7 illustrates an example of torque transfer connections between shaft 300, adapter 400 and coupling 405. As shown in FIG. 7, torque transfer member 410, inner mating member 435, adapter outer splines 430 and coupling splines 450 all may be spaced around the circumference of the components, and mate together. Torque transfer member 410 may mate with inner mating member 435, and adapter outer splines 430 may mate with coupling splines 450. As upstream shaft 305 and downstream shaft 300 rotate, adapters 400 and coupling 405 also rotate as illustrated by rotation arrow 700. When both shafts 300, 305 are mated in this exemplary manner to coupling 405, torque may be transmitted between the shafts 300, 305. The direction of rotation may be clockwise or counterclockwise. Torque transfer member 410 and inner mating member 435 may be splines, teeth, ridges, keyed joints, pinned joints, or any other means known in the art to transfer torque and/or maintain angular correspondence. Adapter outer splines 430 and/or coupling splines 450 may be splines, teeth, or ridges or any other means known in the art to transfer torque and/or maintain angular correspondence whilst engaging adapter 400 and coupling 405 entirely around the outer surface of adapter 400 (nearly 360° around adapter 400), except where contact may be lost due to adapter 400 curvature and/or rocking as described herein.

Figure 5:
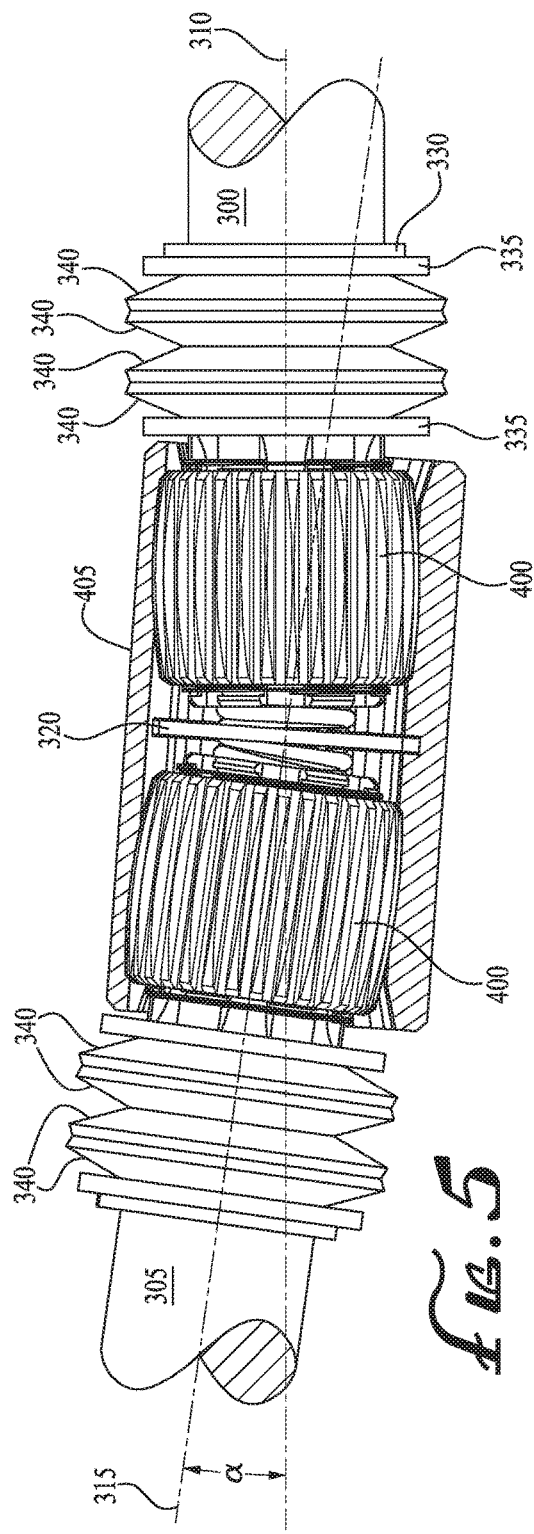
FIG. 5 is a partial cross sectional view of a shaft coupling system of an illustrative embodiment in a bent position.
Figure 6:
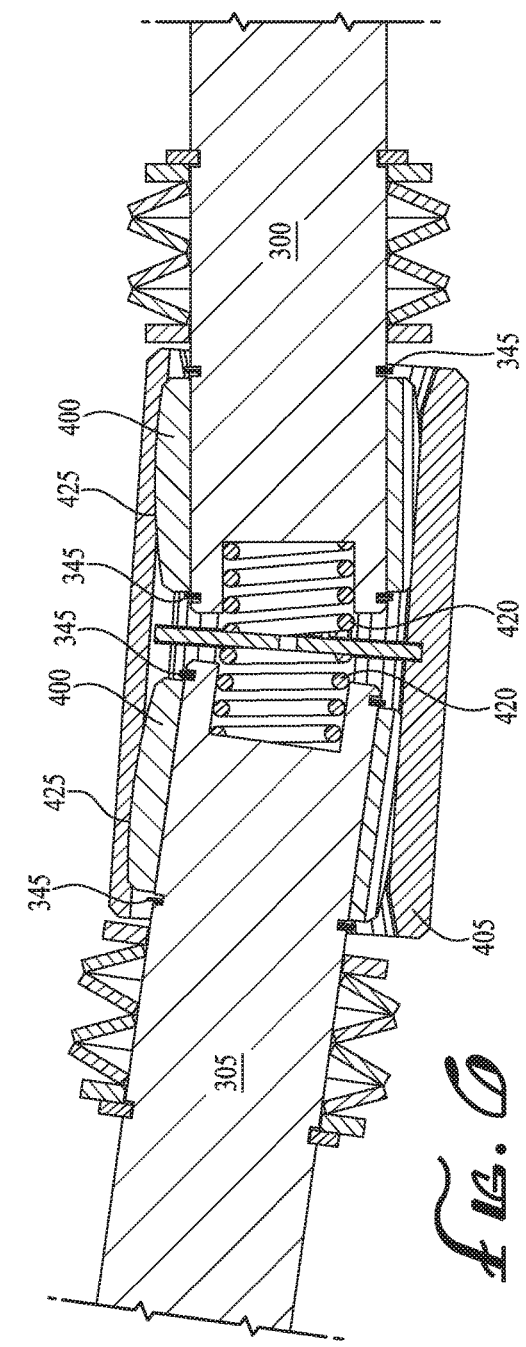
FIG. 6 is a cross sectional view of a shaft coupling system of an illustrative embodiment in a bent position.
Figure 14:
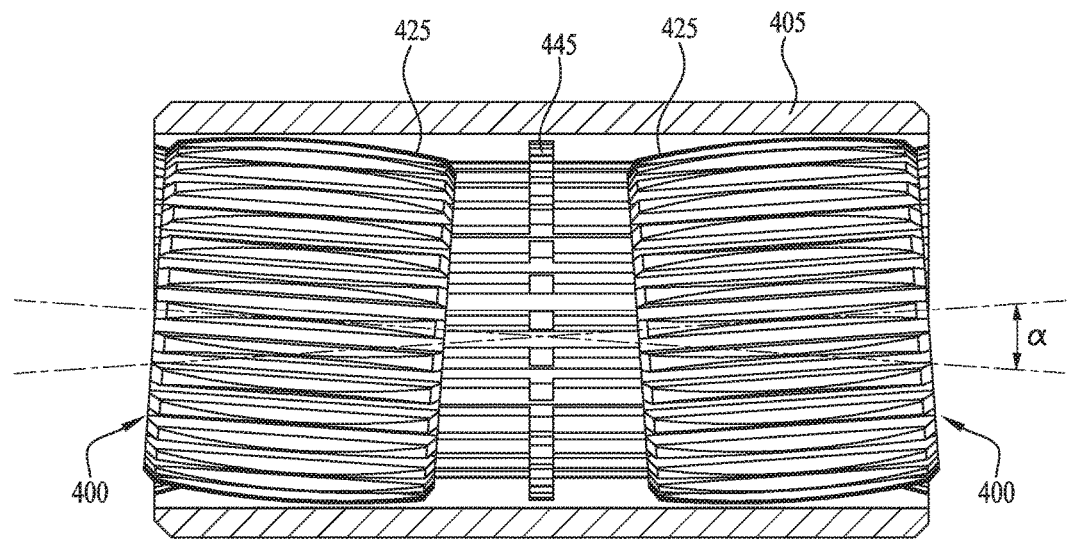
FIG. 14 is a perspective view of a pair of adapters mated to a coupling of an illustrative embodiment in a bent position.
Figure 15:
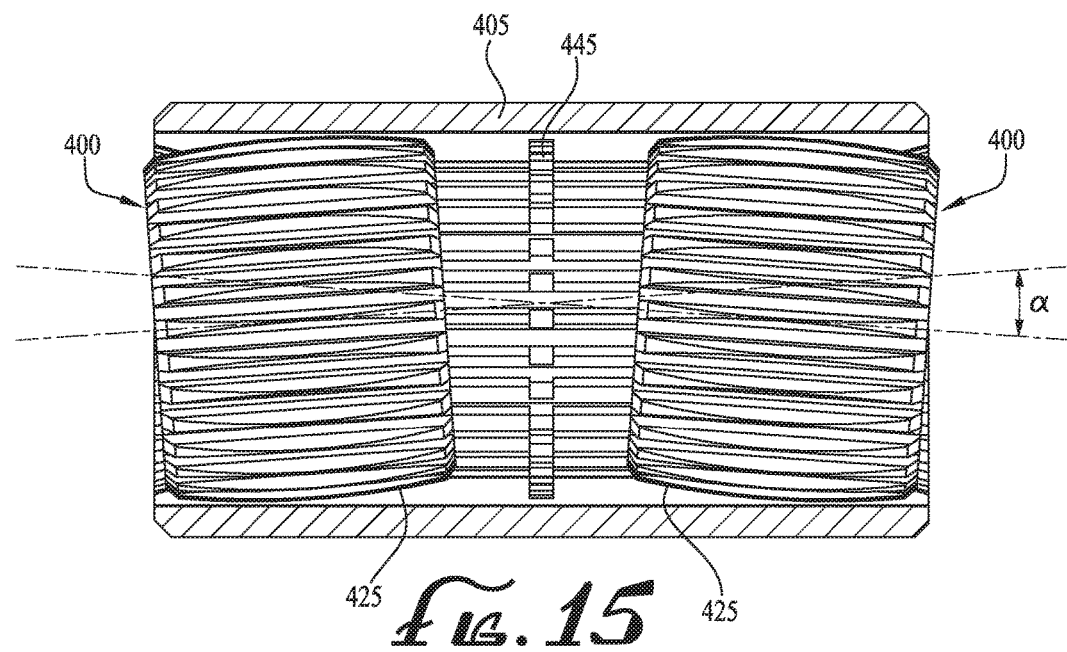
FIG. 15 is a perspective view of a pair of adapters mated to coupling of an illustrative embodiment in a bent position.

As shown in FIG. 1, flexible joint 150 may be located in bend 110, which may cause downstream shaft 300 to be positioned and/or operate out of alignment with upstream shaft 305. FIG. 5 illustrates torque transmitting coupling system 325 when bent. As shown in FIG. 5, first axis of rotation 310 of downstream shaft 300 is misaligned with second axis of rotation 315 of upstream shaft 305. The axes of rotation 310, 315 are out of alignment by angle α. In one example, where coupling 405 is five inches long, angle α may be up to and including ten degrees, which in this example is equivalent to two degrees-per-inch. Two degrees-per-inch is well above the desired twenty-five degrees per one hundred feet, which is the same as about 0.021 degrees per inch. In response to the misalignment of shafts 300, 305, adapter 400 may rock along inner diameter of coupling 405 to self-align and allow torque to be transmitted between shafts 300, 305, without damage to shafts 300, 305 or torque transmitting coupling system 325. As shown in FIG. 5 and FIG. 6, adapters 400 may rock axially along coupling splines 450 to follow shafts 300, 305, yet remain mated to coupling 405. Adapters 400 may rock in a fashion similar to runners of a rocking chair. The rocking motion may be in a longitudinal (axial) direction, while the adapters 400, shafts 300, 305 and coupling 405 are rotating perpendicularly to the direction of tilt and/or around axes of rotation 310, 315. The degree of curvature of adapter outer diameter 425 may be gradual in order to maintain the integrity of the gear strength. The greater the curvature, the greater bend may be tolerated by torque transmitting system 325, but greater curvature may cause adapter 400 to lose contact with coupling 405. The appropriate extent of curvature of adapter outer diameter 425 may be determined based on balancing the degree of torque that must be transmitted and the slope of the bend that must be tolerated. In one example for an ESP equipment string with five-hundred horsepower and a bend of twenty five degrees per one-hundred feet, adapter outer diameter 425 may be curved like a portion of a nine-inch sphere. FIGS. 14-16 illustrate exemplary adapters 400 rocking in bends of varying degrees and directions. FIG. 16 illustrates one embodiment of the manner in which outer splines 430 of adapter 400 may engage coupling splines 450 when rocking and/or when shafts 300,305 are misaligned by angle α. Outer splines 430 remain mated with coupling splines 450, although the contact surface area may be reduced as the angle α increases. At least up to a curve of twenty five degrees per one-hundred feet, the contact surface should remain sufficient to transmit torque of up to 2,000 horsepower.

One of the greatest benefits of using a self-leveling torque transmitting coupling in ESP applications is that the motor string and/or ESP assembly cannot only pass through a tighter bend, but may also operate in a bend of as much 25°/100 feet. ESP assemblies known in the art cannot survive passing through a bend of more than 10°/100 feet, much less actually operate within one.

Illustrative embodiments provide a torque transmitting coupling for an electric submersible pump equipment string. Two adjacent rotatable shafts may each be mated to adapters, the outer diameters of the adapters may be curved spherically and splined to mate with a common coupling. When the two shafts move out of alignment and/or operate out of alignment, the adapters may rock to self-align the shafts whilst remaining mated to the common coupling. In this fashion, torque may be transmitted between the shafts in bends of up to twenty five degrees per one-hundred feet. A series of conical spring washers around the shafts may provide compression and accommodate varying rates of thermal expansion between the shafts. Illustrative embodiments may increase the bend tolerance of ESP equipment strings, which may support the modern trend towards directional drilling. Illustrative embodiments may reduce or eliminate torque lock between adjacent ESP shafts.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An electric submersible pump shaft coupling comprising:
    a first adapter comprising:
        a first tubular inner diameter mateable to a first electric submersible pump shaft; and
        a first spherical outer diameter;

a second adapter comprising:
 a second tubular inner diameter mateable to a second electric submersible pump shaft; and
 a second spherical outer diameter;
the first spherical outer diameter of the first adapter and the second spherical outer diameter of the second adapter rockably mated to a common coupling; and
a series of conical spring washers around each of the first and second electric submersible pump shafts on each side of the common coupling, the series of conical spring washers configured to reduce torque lock between the first and second electric submersible pump shafts.

2. The electric submersible pump shaft coupling of claim 1, further comprising a concave housing around the common coupling.

3. The electric submersible pump shaft coupling of claim 2, further comprising an electric submersible pump motor head secured to a first side of the concave housing, and an electric submersible pump motor base secured to a second side of the concave housing.

4. The electric submersible pump shaft coupling of claim 1, wherein the first spherical outer diameter and the second spherical outer diameter are circumferentially mated to the common coupling by spline.

5. A torque transmitting coupling system comprising:
 a first adapter comprising:
  a first inner diameter mated to a first shaft rotatable about a first axis of rotation; and
  a first splined outer diameter mated to an inner surface of a splined coupling;
 a second adapter comprising:
  a second inner diameter mated to a second shaft rotatable about a second axis of rotation; and
  a second splined outer diameter mated to the inner surface of the splined coupling;
 the first splined outer diameter of the first adapter and the second splined outer diameter of the second adapter at least partially spherical such that when the first axis of rotation moves with respect to the second axis of rotation, at least one of the splined outer diameters rock along the inner surface of the splined coupling;
 a series of conical spring washers around each of the first shaft and second shaft on each side of the splined coupling, the series of conical spring washers configured to reduce torque lock between the first shaft and the second shaft; and
 wherein the first shaft and the second shaft are electric submersible pump equipment string shafts.

6. The torque transmitting coupling system of claim 5, further comprising:
 a plate separating the first and second adapters, the plate seated in a groove in the splined coupling inner surface.

7. The torque transmitting coupling system of claim 6, further comprising a first spring between the plate and the first shaft and a second spring between the plate and the second shaft.

8. The torque transmitting coupling system of claim 5, wherein the splined coupling transmits a torque from the first rotatable shaft to the second rotatable shaft.

9. The torque transmitting coupling system of claim 5, comprising a pair of thrust washers sandwiching series of conical spring washers.

10. The torque transmitting coupling system of claim 5, wherein the first inner diameter is mated to the first shaft by spline, and the second inner diameter is mated to the second shaft by spline.

11. An electric submersible pump equipment string comprising:
 a first electric submersible motor comprising a first motor shaft;
 a second electric submersible motor in tandem with the first electric submersible motor, the second electric submersible motor comprising a second motor shaft;
 the first motor shaft mated to a first inner diameter of a first adapter;
 the second motor shaft mated to a second inner diameter of a second adapter;
 the first motor shaft coupled to the second motor shaft by a tubular shaft coupling, the tubular shaft coupling comprising:
  a splined inner diameter mated to:
   a first splined outer diameter of the first adapter; and
   a second splined outer diameter of the second adapter;
  the first and second splined outer diameters curved to form a runner surface on each of the first and second adapters;
  the runner surfaces rockable axially along the splined inner diameter; and
  a spring member around each of the first and second motor shafts between a retaining ring and the tubular shaft coupling, the spring member adapted to reduce torque lock between the first motor shaft and the second motor shaft.

12. The electric submersible pump equipment string of claim 11, wherein the spring member is a plurality of conical spring washers.

13. The electric submersible pump equipment string of claim 12, further comprising a thrust washer between the retaining ring and the plurality of conical spring washers.

14. The electric submersible pump equipment string of claim 11, wherein the runner surfaces rock when the first motor shaft moves out of axial alignment with the second motor shaft.

15. The electric submersible pump equipment string of claim 11, wherein a torque is transmitted from the second motor shaft to the first motor shaft.

16. An electric submersible pump assembly comprising:
 a first end of a first shaft facing a second end of a second shaft;
 a splined coupling extending around the first end and the second end;
 an adapter around each of the first end and the second end, each adapter between the splined coupling and one of the shaft ends, wherein each adapter comprises:
  a torque transmitting member around an inner diameter mated with at least one of the shaft ends;
  a set of splines around an outer diameter mated with the splined coupling;
  the outer diameter of the adapter tapered in an axial direction; and
  a set of conical spring washers in series around each of the first shaft and the second shaft on each side of the splined coupling such that the sets of conical spring washers reduce torque lock between the first shaft and the second shaft.

17. The electric submersible pump assembly of claim 16, wherein the first shaft is a motor shaft and the second shaft is a seal shaft.

18. The electric submersible pump assembly of claim 16, wherein the first shaft is a seal shaft and the second shaft is one of a gas separator shaft, a pump shaft or an intake shaft.

19. The electric submersible pump assembly of claim 16, wherein both sides of the adapter outer diameter are symmetrically tapered from center.

20. The electric submersible pump assembly of claim 16, wherein the taper is spherical.

21. The electric submersible pump assembly of claim 16, further comprising a plate extending centrally inside the splined coupling between the first end and the second end, the plate seated in a groove extending around an inner diameter of the splined coupling.

22. The electric submersible pump assembly of claim 16, wherein at least one of the sets of conical spring washers are between a motor base and the splined coupling.

23. The electric submersible pump assembly of claim 16, further comprising a concave housing around the splined coupling.

24. The electric submersible pump assembly of claim 16, wherein the torque transmitting member is splines.

\* \* \* \* \*